Aug. 1, 1967 R. E. WARREN 3,333,936

COOLER COMPENSATING HEATER FOR TEMPERATURE CONTROL IN GLASS MAKING

Filed Oct. 15, 1965 2 Sheets-Sheet 1

INVENTOR.
Richard E. Warren
BY
Nobbe & Swope
ATTORNEYS

INVENTOR.
Richard E. Warren
BY
Nobbe & Swope
ATTORNEYS

United States Patent Office 3,333,936

Patented Aug. 1, 1967

3,333,936

COOLER COMPENSATING HEATER FOR TEMPERATURE CONTROL IN GLASS MAKING

Richard E. Warren, Toledo, Ohio, assignor to Libbey-Owens-Ford Glass Company, Toledo, Ohio, a corporation of Ohio Filed Oct. 15, 1965, Ser. No. 496,471
9 Claims. (Cl. 65—182)

The present invention relates broadly to means and techniques for controlling the temperature of liquid and/or solid bodies. More particularly it is concerned with heat exchangers of special construction and with a method of operating the same to regulate their capacity to exchange heat with an adjacent body or mass.

Although not restricted thereto, the invention is primarily adapted for the use in the manufacture of glass and in an area wherein a body of glass in sheet and/or in molten form is being processed within a substantially closed chamber containing an atmosphere different from the outside atmosphere.

Examples of such areas are the enclosed drawing chambers of window glass machines through which a continuous ribbon is drawn from a mass of molten glass (shown for example in U.S. Patent No. 2,267,604, issued Dec. 23, 1941, to John L. Drake et al.); and the enclosed float chambers in float glass machines within which a buoyant body of molten glass in ribbon form is established on and advanced over a bath of molten tin (see U.S. Patent 3,083,551, issued Apr. 2, 1963, to L. A. B. Pilkington).

In fact the invention appears presently to have its greatest potential when embodied in means and procedures for cooling the glass ribbon in the latter environment and it will be specifically described in that connection here. Thus, in the production of float glass it is sometimes necessary to cool the floating glass body or ribbon in order to assist in controlling the temperature of the glass and of the bath of molten tin on which it floats; and because a given float bath may be required to produce glass ribbons of different thicknesses, different widths or at different ribbon speeds, the amount and degree of overhead cooling required may vary over wide limits.

Further the rate at which the ribbon and tin are cooled in the areas where the ribbon is soft and can be easily deformed or distorted is of paramount importance to the final quality of the glass. Too rapid chilling or cooling of the glass and tin will cause what is known as "dapple" or "hammer" in the ribbon which becomes distortion defects in the final product.

Accordingly it is an important object of this invention to provide an improved method and apparatus for controlling the temperature of a moving body of glass.

Another object is the provision of a heat exchanger of a construction which, when used in proximity to a moving glass body, permits the exchange of heat between it and the glass to be varied over wide limits or to be regulated within narrow limits.

Another object is to provide a cooler within a substantially closed chamber with means for changing or controlling the degree of cooling without opening the chamber or physically removing the cooler therefrom.

Another object is the provision of a heat exchanger possessing different heat exchanging capacities in one position than in another and of means for adjusting its position to regulate its capacity to exchange heat.

Still another object is to provide a cooler in the form of a casing through which a coolant is circulated and which has insulated surface areas and exposed surface areas; and to adjust the position of said insulated and exposed areas relative to a body to be cooled.

Further objects and advantages of the invention will become more apparent during the course of the following description when taken in connection with the accompanying drawings.

In the drawings, wherein like numerals are employed to designate like parts throughout the same:

Prefacing more particular reference to the drawings, it is explained in U.S. Patent 3,083,551 that the manufacture of flat glass by the float process involves delivering glass at a controlled rate onto a bath of molten metal and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as it advances to permit it to be taken unharmed out of the bath by mechanical conveying means.

Normally this produces an ultimate ribbon of a thickness essentially the same as the stable or equilibrium thickness of the buoyant body but a thinner ultimate ribbon may be produced by increasing the speed of the mechanical conveying means that removes the ribbon from the molten bath thereby increasing the tractional effort on and so attenuating the glass body of stable thickness as it is advanced along the bath.

Figure 1:
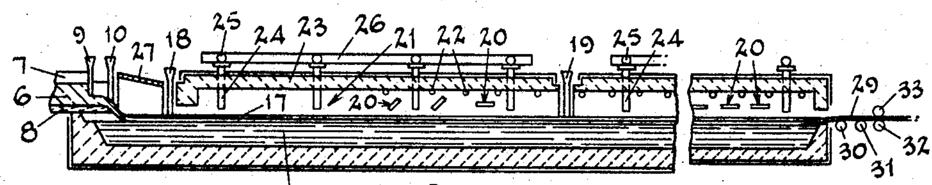
FIG. 1 is a longitudinal sectional view through a typical float glass apparatus incorporating the present invention.
Figure 2:
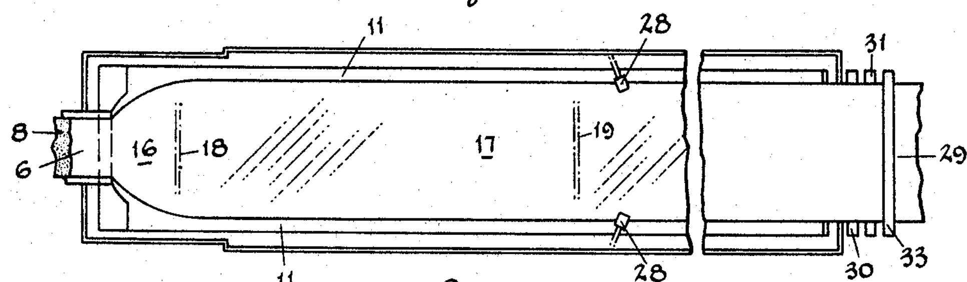
FIG. 2 is a plan view of the apparatus of FIG. 1 with the superstructure removed.

Illustrative of these basic concepts there is shown in FIGS. 1 and 2 of the drawings a typical float glass apparatus similar to one disclosed in U.S. Patent 3,083,551. In this apparatus molten glass 6 is supplied from a forehearth 7 to a spout lip 8 in an amount regulated and controlled by a tweel 9 and a gate 10.

The glass flowing from the spout 8 onto the metal bath 11 forms a buoyant molten body indicated at 16 and a buoyant layer of stable thickness 17 develops therefrom.

The metal bath in the tank structure and the headspace 21 over the bath are heated by radiant heat directed downwardly from heaters 22 and, under certain operating conditions, it may be desirable or necessary to also provide cooling means in the area between tweels 18 and 19. According to the instant invention, greatly improved temperature control can be had by the use of special coolers such as indicated at 20 in the headspace.

This headspace 21 contains the "float atmosphere" and is enclosed by a roof structure 23 which, with extension 27, makes it possible to maintain a sufficient volume of protecting gas over that part of the metal bath 11 that is exposed at each side of the glass in the float chamber. The roof structure 23 is provided at intervals with ducting 24 connected by branches 25 to headers 26 through which the protecting gas is fed into the headspace 21 at a rate to create a plenum therein. The protecting gas is one which will not chemically react with tin to produce contaminants of the glass and, by providing a plenum ingress to the headspace 21, entrance of atmospheric air is prevented.

When the ultimate ribbon 29 is to be of substantially the same thickness as the equilibrium or stable thickness of the glass the temperature of the glass in the buoyant layer or ribbon 17 must be carefully controlled so as to progressively cool it from the tweel 19 to the discharge end of the apparatus.

This can be readily and accurately accomplished with the coolers of this invention which may be located and controlled within the headspace to act to any desired extent on any desired area of glass or metal until the ribbon surface reaches a temperature at which it is sufficiently stiffened to allow its transfer to a lehr on mechanical conveying means without detriment to the surfaces, e.g., about 650° C. at which the viscosity is about $10^7$ poises.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet end sufficient to advance it along the bath.

When a ribbon of less than equilibrium thickness is desired, this can be obtained by increasing the speed of the rolls 30 to 33 and thereby modifying their tractional effort and attenuating the molten glass body 17 of stable thickness. However, to produce at the discharge end of the apparatus an ultimate ribbon which has a width approaching the width of the buoyant body of molten glass of stable thickness but thinner than the stable body, horizontally disposed edge rolls indicated at 28 are employed to assist in holding the ribbon to width and the glass temperature must be accurately controlled to regulate the longitudinal change in its viscosity in relation to the tractive effort of the rolls 30 to 33 and so arrest further dimensional change once the ribbon has assumed the desired width and thickness.

Also the glass must be sufficiently cooled upstream of the edge rollers so that it will not stick and will be a low enough temperature for the edge rolling operation. At the same time, however, excessive chilling will cause the objectionable "hammer" and "batter" referred to above as a result of temperature gradients through the glass.

Another critical quality element that has been found to be closely related to cooling in the front end of the bath is the problem of large open bottom bubbles that are formed during the reheat operation. It is believed that a chemical reaction takes place in the tin which releases a gas. The gas in turn forms bubbles, comes to the surface of the tin, and is trapped underneath the glass ribbon, which is at a temperature of from 1500° to as high as 1800° F. The trapped bubble causes deformation of the bottom surface of the glass, resulting in the defect in the final product known as large open bottom bubble. If the ribbon is being stretched to make thin glass these bubbles are also stretched and can be up to 4 to 5″ long. Necessarily they render the portion of the ribbon surrounding the bubble completely unusable.

The mechanism of the formation of reheat bubbles is not completely understood, but it is believed that it is extremely closely related to the amount of dissolved hydrogen in the tin and possibly to the amount of tin oxide present in the tin. I know that it is extremely sensitive to temperature or temperature differentials in the tin. It is believed that the gas itself is almost pure hydrogen. When edge rolling, these bubbles may appear underneath or just downstream of the conventional coolers and are extremely sensitive to the location of the coolers and the total number used.

Consequently the provision of improved cooling by the use of suitable coolers in the "float chamber" and particularly in selected areas thereof is an important feature of this invention. Of equal importance is the provision of heat exchangers of a type that are capable of exerting a cooling action on the glass and on the tin bath of a character susceptible of accurate control and rapid adjustment within rather wide limits. Indeed, the correct use of properly designed coolers can minimize if not entirely eliminate the troublesome problems of distortion and reheat bubbles.

To this end, the form of cooler contemplated by the present invention for use in the float area is preferably of hollow metal construction through which a suitable coolant such as water can be circulated and, to prevent overheating of the coolers and/or rapid generation of disruptive steam pressure, the coolant must be kept flowing through the coolers from prior to installation until after they are removed from the float atmosphere.

Figure 3:
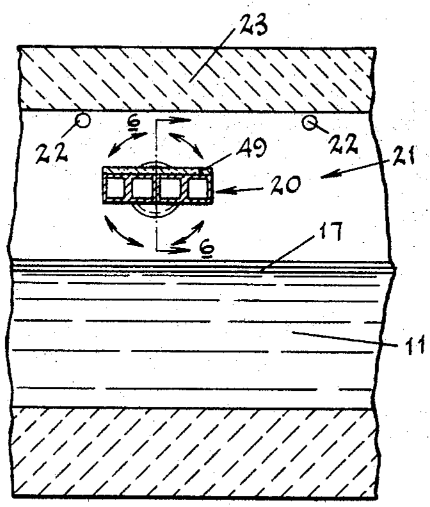
FIG. 3 is a fragmentary view on an enlarged scale of a portion of the apparatus of FIG. 1.
Figure 4:
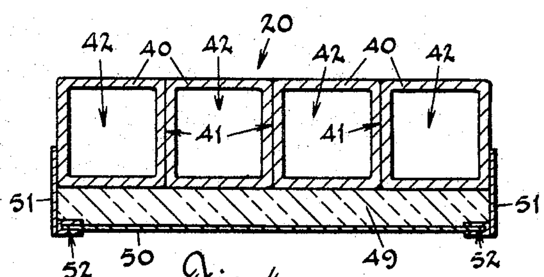
FIG. 4 is an enlarged detail view of the cooler of FIG. 3.
Figure 9:
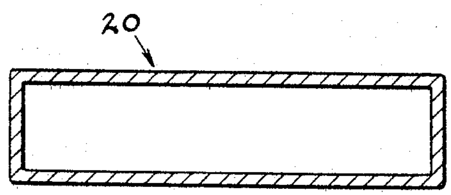
FIGS. 9 to 11 are sectional views of modified forms of heat exchangers.
Figure 10:
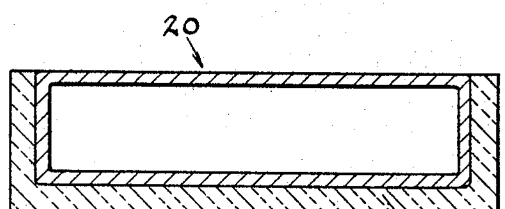
Figure 11:
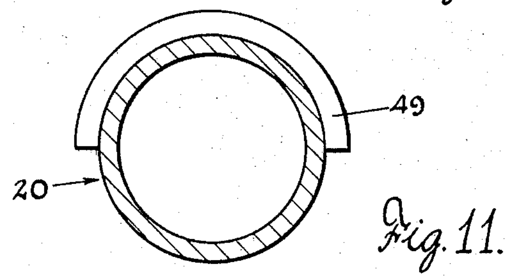

In their preferred form the coolers 20 are generally elongated in shape and may be made up of a single section having any one of a number of different cross-sections as illustrated in FIGS. 9 to 11 of the drawings; or they may be, and usually are, made up of several such individual sections welded together to form a substantially rectangular section having one dimension, the width, several times the height as best illustrated in FIGS. 3 and 4 of the drawings. These coolers are installed transversely across the bath spanning its entire width and are located at some nominal distance above the glass layer or ribbon 17. For example they can be located midway in elevation between the bottom of the electric or radiant heaters 22 in the roof of the bath chamber and the level of the molten metal 11.

Although, as will be more clearly hereinafter explained, the coolers may be effectively employed with uncovered surfaces as indicated in FIG. 9 it is preferred that they be covered on at least one side with insulation to effectively shield the insulated surface of the cooler from acting as a black body absorber of radiant heat.

Figure 5:
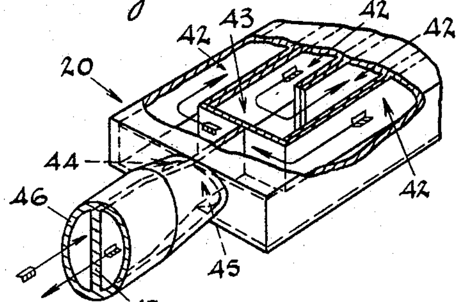
FIG. 5 is a fragmentary perspective view of one end of the same.
Figure 7:
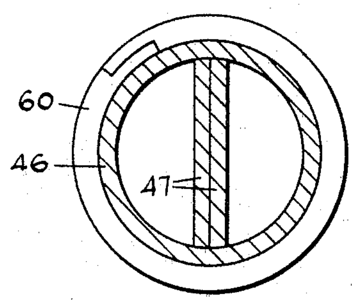
FIG. 7 is a sectional view taken substantially along the line 7—7 in FIG. 6.

Specifically, as best shown in FIG. 4, a cooler may be constructed in accordance with the invention of a number of elongated individual sections 40 arranged in side by side relationship and welded together at their adjoining surfaces 41 to provide the elongated casing 20 that is substantially rectangular in cross-section and partitioned to provide a series of parallel passages 42. As best shown in FIG. 5 openings 43 can be cut between adjacent partition walls 42 to provide a single tortuous passageway through the casing 20 leading from an inlet opening 44 to an outlet opening 45 in open communication with an end connection 46, in the form of a split pipe (FIG. 7) having watertight baffles 47 arranged centrally thereof to divide the inlet and outlet sides.

The end connection 46 not only acts as a water inlet and outlet but also as support for the cooler. At the opposite end a dummy end pipe (not shown) of similar dimensions is provided to act as a support only.

As best shown in FIG. 4 the cooler casing 20 is provided with a layer of insulating material 49 on one side thereof. This may be any material of a character and in a thickness and density to suit the requirements. For example a ½″ or 1″ thick layer of "Super X." In order to provide a physical support for the insulation and also to minimize the possibility of pieces of insulation falling onto the hot glass ribbon, thus damaging the surface, the insulation layer can be held in place by a plate of stainless steel 50. See FIG. 1. The stainless plate can be supported by side plates 51 welded to the sides of the cooler and provided with a slot arrangement 52 at the bottom within which opposite margins of the stainless plate fit, with clearance. This will allow the stainless steel plate to be free to expand when heated and to grow in dimension relative to the cooler and the side plates which are kept relatively cool by the water and by conduction through the metal.

Figure 8:
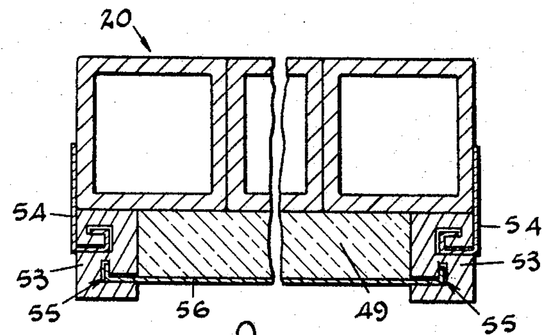
FIG. 8 is a fragmentary sectional view similar to FIG. 4 showing a modified form of insulation support.

A further modification can be made to more fully isolate the bottom stainless plate. This is shown in FIG. 8. In this case ceramic sections 53 are molded so they will key onto a hanger 54 welded onto the cooler and to provide another slot 55 in which a bottom stainless steel plate 56 fits. To alleviate expansion problems, the hanger that is welded to the cooler is slotted so that some expansion can take place in the ceramic block and yet not warp the hanger. The ceramic blocks can be made in sections from a few inches long to one or more feet long. The joints between adjacent sections can be cut on angle so as to provide an almost continuous section. The stainless steel bottom plate is preferably all in one piece and free to expand longitudinally relative to the cooler and the ceramic side supports.

With the coolers heretofore employed in the float chamber it was necessary, in order to make any change required in the amount of cooling at a given location, to physically remove the coolers already there and/or to install new coolers. This necessitated breaking the bath seal at each side of the cooler location (the coolers were usually sealed in or to the bath casing with a gas impervious mortar-like material) slide the cooler in or out and then reseal the bath all of which was both time and labor consuming and opened the float chamber to allow oxygen and other contaminants to enter.

On the other hand the cooler of this invention can be substantially permanently mounted in the float chamber and then readily adjusted to control and regulate the amount of heat exchange between the cooler and the glass and molten metal bath.

Figure 6:
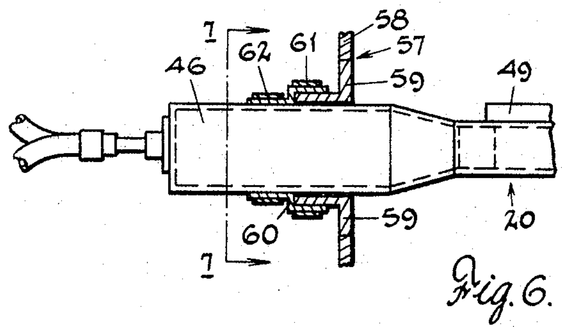
FIG. 6 is a transverse sectional view taken substantially along the lines 6—6 in FIG. 3.

Thus, as best shown in FIG. 6 the cooler 20 is preferably installed above the tin bath 11 from the water connection side. To this end openings 57 large enough to accommodate and maneuver the cooler are provided in the side casing 58 of the float chamber. After a cooler 20 has been set in location and with the end connection 46 and the dummy end pipe in the openings 57, split steel frames with flanges 59 are placed around the cooler end connection and support pipe and welded into place. Split silicone rubber sleeves 60 (FIGS. 6 and 7) are then put in place and the sleeve end that fits the steel flange on the bath side wall is clamped into place with a suitable pressure clamp 61. The cooler is then rotated to proper position, bare cooler side facing the glass as shown in FIG. 3 for example if it is desired to cool the glass at a maximum rate of cooling; with the insulated side facing the glass (FIG. 12) if it is desired to reduce the cooling of the glass ribbon to a minimum; or with the long dimension vertical (FIG. 15) if it is desired to give a mild area type cooling. Clamps 61 and 62 on the silicone rubber sleeve on each end of the cooler are then tightened securely, effectively sealing the bath from infiltration of air as well as holding the cooler securely in place.

Should the bath cooling requirements change, the cooler arrangement can be readily adjusted by loosening the clamps 61 and 62 over the silicone rubber sleeves on the cooler ends and rotating individual coolers to any position and degree of angularity desired and then retightening the clamps holding the cooler in proper position.

Figure 12:
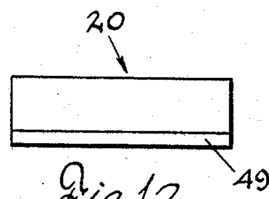
FIGS. 12 to 15 are diagrammatic illustrations of various positions in which a preferred form of cooler can be arranged in regulating the amount of heat exchanged between it and adjacent mass or body.
Figure 13:
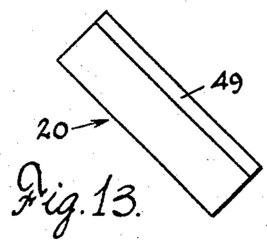
Figure 14:
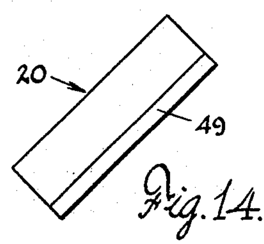
Figure 15:
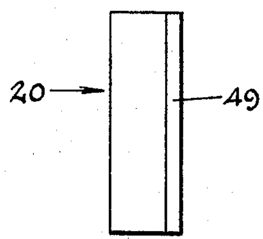

The three cooler positions indicated in FIGS. 13 to 15 will give a modified effect from the extremes shown in FIGS. 3 and 12. Thus, since these coolers are essentially black body radiant heat absorbers, the amount of cold surface exposed to the glass surface determines the amount of cooling and, inasmuch as each cooler is infinitely adjustable over a 360° rotation, the amount and rate of cooling can be regulated in an infinite number of steps. In this manner the cooling characteristics of one or more coolers can be drastically changed or infinitely varied quickly, with a minimum of manpower and without opening the bath and thus risking bath atmosphere contamination with resultant glass loss due to quality deterioration.

The special coolers of the invention lend themselves especially well to use with electric roof heating, making it easier and more effective. They can be built in any configuration with the only limitations being that they be located between overhead bath roof interferences and the glass and that their width at the widest point not exceed the total height between the glass and the bath roof interferences.

In the event more temperature control is desired than that obtained with insulation on the bottom of the cooler only (FIG. 3), the cooler can be further modified by insulating the sides as well as the bottom as shown in FIG. 10.

In fact it is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. In an apparatus for regulating the temperature of a body of glass moving through a chamber between spaced side walls thereof, a heat exchanger comprising a casing mounted above and transversely of said moving body of glass, said casing having a continuous tortuous passageway therein extending from an inlet at one of its ends to an outlet at the same end and through which a heat absorbing medium is circulated, a pipe secured to each end of said casing, each said pipe extending through an opening in the adjacent side wall for mounting said casing within said chamber, a longitudinally extending baffle within the pipe at said inlet and outlet end of said casing, said baffle dividing the interior of said last named pipe into a first chamber in communication with said inlet and a second chamber in communication with said outlet, a frame secured in each of said openings, a flange on each said frame surrounding the said pipe extending through said opening and within which said pipe can be rotated to adjust the angular position of said casing relative to said glass body, a resilient sleeve surrounding each said pipe and extending over said flange, a first clamp around the portion of each said resilient sleeve extending over said flange, a second clamp around each said resilient sleeve and said pipe outwardly of said flange, means continuously supplying a heat absorbing medium to said first chamber for circulation through said casing along said tortuous path, and means for removing the heat absorbing medium from said second chamber.

2. An apparatus for regulating the temperature of a body of glass as claimed in claim 1, wherein said casing comprises a plurality of elongated tubular members secured together in side-by-side relationship with their interiors interconnected to form said tortuous path.

3. An apparatus as defined in claim 1 in which said casing has at least one flat surface area.

4. Apparatus as defined in claim 1 in which said casing has a curved surface area.

5. An apparatus as defined in claim 1 in which a part of the surface area of said casing is insulated.

6. An apparatus as defined in claim 1 in which said casing is substantially rectangular in cross-section.

7. Apparatus as defined in claim 6 in which a layer of insulation is provided on one side of said casing.

8. In an apparatus for producing glass in sheet form, a container, a bath of molten metal in said container, a substantially closed chamber enclosing an atmosphere other than the outside atmosphere over said bath, means for establishing a buoyant body of molten glass in ribbon form on said metal bath, means for advancing said ribbon along said bath and subjecting the same to a controlled tractive force in the direction of its said advance, a heating means positioned above said body of glass to heat the body, a radiative cooler in the form of a casing having at least one flat surface area located within said closed chamber between said heating means and said body of glass and extending transversely of the chamber, means mounting said casing for rotary movement about its longitudinal axis to adjust the position of said flat surface area relative to said glass, and means for circulating a heat absorbing fluid through said casing.

9. An apparatus as defined in claim 8 in which said casing is generally rectangular in cross-section, a layer of insulation is provided on one side of said casing, said mounting means includes an extension on the end of said casing extending through a wall of said chamber, and means is provided in surrounding relation to said extension for preventing contamination of the atmosphere within said closed chamber by the outside atmosphere through the area where said end extension extends through said wall.

References Cited

UNITED STATES PATENTS

| | | | |
|---|---|---|---|
| 2,066,376 | 1/1937 | Walters | 165—96 |
| 3,000,142 | 9/1961 | Long | 65—204 X |
| 3,083,551 | 4/1963 | Pilkington | 65—182 X |
| 3,223,502 | 12/1965 | Ward et al. | 65—83 X |
| 3,263,738 | 8/1966 | Schwamborn et al. | 165—86 X |

FOREIGN PATENTS

| | | |
|---|---|---|
| 9,865 | 7/1928 | Australia. |
| 812,308 | 2/1937 | France. |
| 946,411 | 1/1964 | Great Britain. |

ROBERT A. O'LEARY, *Primary Examiner.*

MEYER PERLIN, *Examiner.*

A. W. DAVIS, *Assistant Examiner.*